(12) United States Patent
Appelboum et al.

(10) Patent No.: US 8,925,989 B2
(45) Date of Patent: Jan. 6, 2015

(54) CENTER CONSOLE

(71) Applicants: Volkswagen AG, Wolfsburg (DE); Audi AG, Ingolstadt (DE)

(72) Inventors: Yuval Appelboum, Venice, CA (US); Christopher Ha, Fremont, CA (US)

(73) Assignees: Volkswagen AG, Wolfsburg (DE); Audi AG, Ingolstadt (DE)

( * ) Notice: Subject to any disclaimer, the term of this patent is extended or adjusted under 35 U.S.C. 154(b) by 0 days.

(21) Appl. No.: 13/833,741

(22) Filed: Mar. 15, 2013

(65) Prior Publication Data

US 2014/0265405 A1  Sep. 18, 2014

(51) Int. Cl.
*B60R 7/04* (2006.01)

(52) U.S. Cl.
CPC ........................................ *B60R 7/04* (2013.01)

USPC ........................................ 296/24.34; 296/37.8

(58) Field of Classification Search
USPC ............................................... 296/37.8, 24.34
See application file for complete search history.

(56) References Cited

U.S. PATENT DOCUMENTS 6,616,205 B2 * 9/2003 Bruhnke et al. ............. 296/37.8

* cited by examiner

*Primary Examiner* — Joseph D Pape
(74) *Attorney, Agent, or Firm* — Barnes & Thornburg LLP

(57) ABSTRACT

A center console for use in a passenger vehicle is adapted to be located between a pair of passenger seats. The center console includes a storage container formed to include a storage space accessible through an aperture and armrests coupled to the storage container to provide a support surface for the arms of passengers in the seats and to regulate access to the storage space.

18 Claims, 3 Drawing Sheets

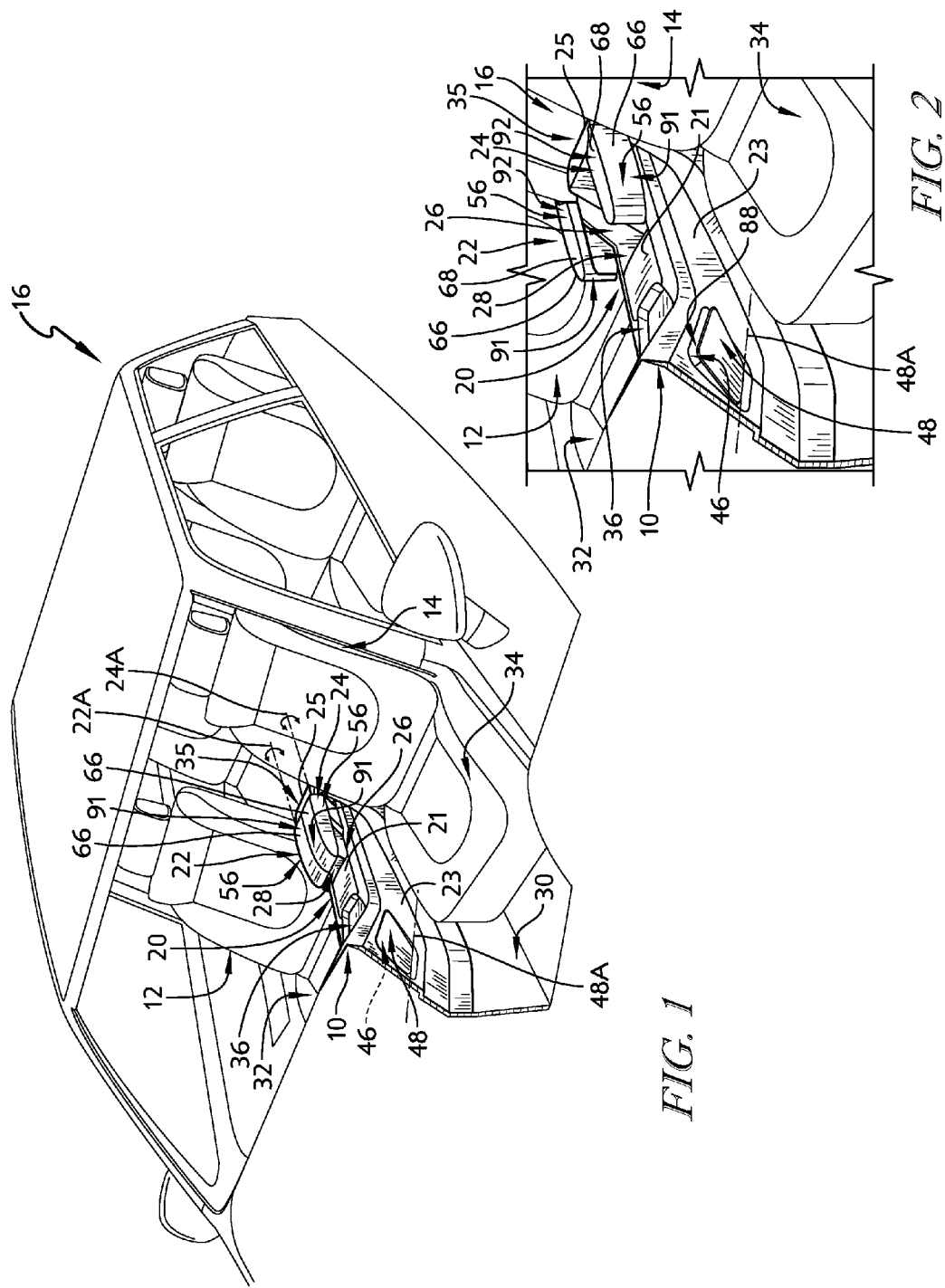

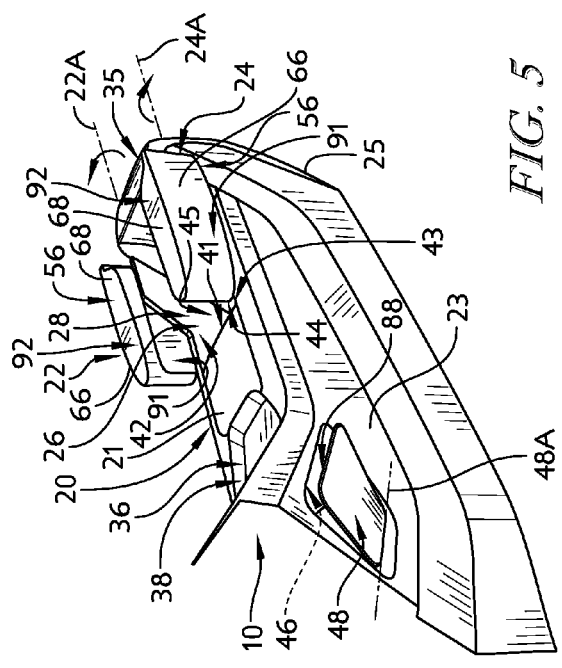
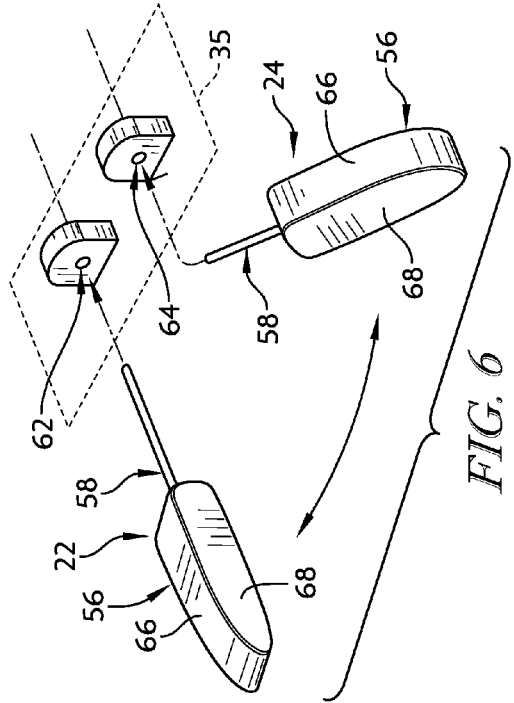
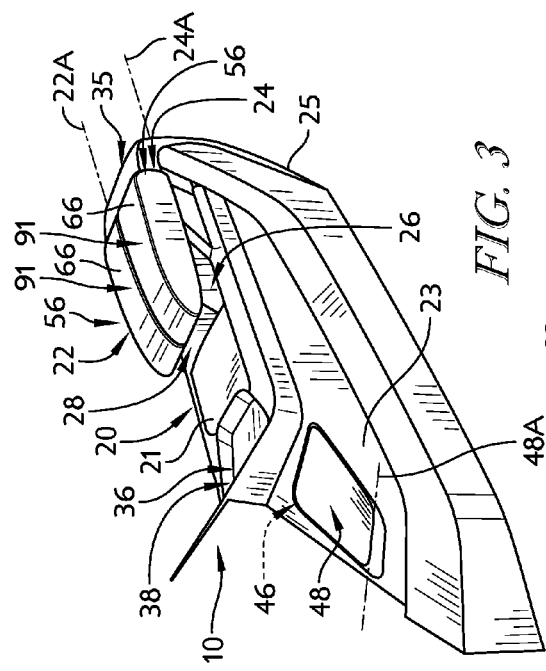
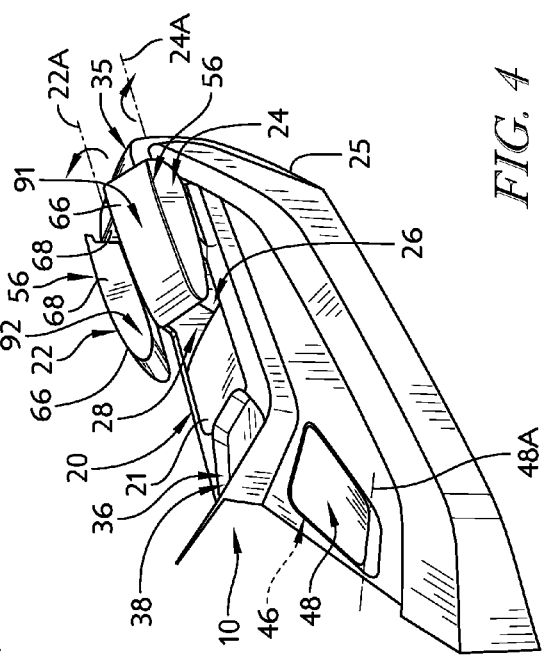

CENTER CONSOLE

BACKGROUND

The present disclosure relates to a center console for use in a passenger vehicle. In particular, the present disclosure is directed to a center console including a storage container that is located between a pair of passenger seats in a passenger vehicle.

SUMMARY

According to the present disclosure, a center console is adapted for use between left and right passenger seats in a passenger vehicle. The center console includes a storage container that forms a storage space for holding items in the passenger vehicle. The storage space is accessible through an upwardly-opening aperture formed in the storage container.

In illustrative embodiments, the center console also includes a left armrest and a right armrest. The left and the right armrests are each coupled to the storage container to independently pivot from a closed position to an open position. The left armrest blocks access to the storage space through a left portion of the aperture when in the closed position and allows access to the storage space through the left portion of the aperture when in the open position. Similarly, the right armrest blocks access to the storage space through a right portion of the aperture when in the closed position and allows access to the storage space through the right portion of the aperture when in the open position.

In illustrative embodiments, the left and the right armrests each include a pad that provides upwardly-facing arm-support surfaces to passengers both while in the closed position and while in the open position. Thus, passengers on left and right sides of the storage container are able to rest an arm on one of the armrests both when access to the storage space is blocked and when access to the storage space is allowed.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which:

FIG. 1 is a broken-away perspective view of a passenger vehicle including front-row seating with a center console located between left and right passenger seats showing that the center console includes a storage container that forms a storage space, a left armrest coupled to the storage container for movement about a pivot axis to block or allow access into the storage space, and a right armrest coupled to the storage container for movement about a pivot axis to block or allow access into the storage space;

FIG. 2 is a view similar to FIG. 1 showing the left and the right armrests pivoted to allow access into the storage space through an upwardly-opening aperture while still providing arm-support surfaces for passengers in the left and right passenger seats;

FIG. 3 is a detail perspective view of the center console of FIGS. 1 and 2 showing each of the left and the right armrests in a closed position blocking access into the storage space formed in the storage container;

FIG. 4 is a detail perspective view similar to FIG. 3 showing each of the left and the right armrests moving from the closed position to an open position by pivoting about left and right pivot axes;

FIG. 5 is a detail perspective view similar to FIGS. 3 and 4 showing each of the left and the right armrests in the open position allowing access into the storage space formed in the storage container while still providing arm-support surfaces for use by passengers seated next to the center console;

FIG. 6 is a partially-diagrammatic exploded view of the left and the right armrests spaced apart from shaft-receiving cavities included in an armrest mount of the storage container;

DETAILED DESCRIPTION

Figure 7A:
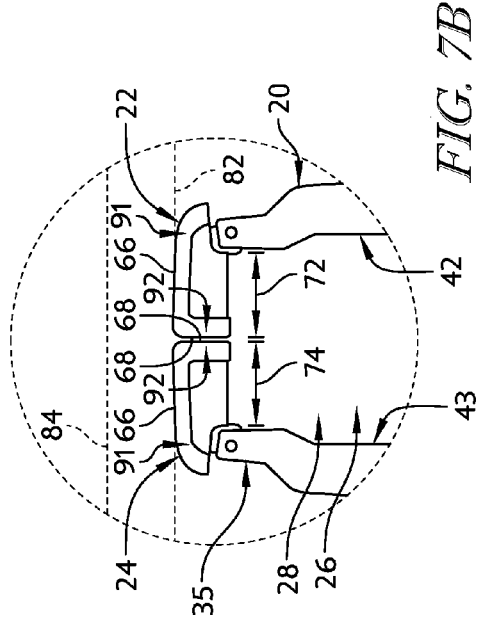
FIG. 7A is a rear elevation view of the front-row seating and center console shown in FIG. 1 showing each of the left and the right armrests in a closed position.

According to the present disclosure, an illustrative center console 10 adapted to be used between a left passenger seat 12 and a right passenger seat 14 in a passenger vehicle 16 as shown in FIG. 1. The center console 10 illustratively includes a storage container 20, a left armrest 22, and a right armrest 24. The storage container 20 includes a rear storage space 26 that is accessible through an upwardly-opening aperture 28 as shown in FIG. 2. The left and the right armrests 22, 24 are each coupled to the storage container 20 and are each independently pivotable relative to the storage container 20 to either block or allow access through portions of the aperture 28 into the rear storage space 26 as shown in FIGS. 1 and 2.

Figure 8A:
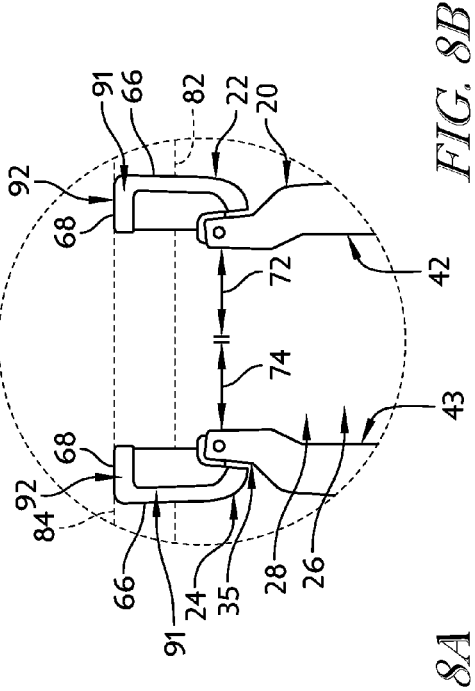
FIG. 8A is a view similar to FIG. 6 showing each of the left and the right armrests in the open position.

The left and the right armrests 22, 24 illustratively provide arm-support surfaces to passengers supported on the left and the right passenger seats 12, 14 both while the armrests 22, 24 block access to the rear storage space 26 through portions of the aperture 28, as shown in FIG. 1, and while the armrests 22, 24 allow access to the rear storage space 26 through portions of the aperture 28 as shown in FIG. 2. Thus, passengers seated in the left or the right passenger seats 12, 14 are able to rest an arm on either the left or the right armrests 22, 24 when access to the rear storage space 26 is blocked or allowed as shown in FIGS. 7A and 8A.

In the illustrative embodiment, the storage container 20 is statically mounted on a base 30 extending up from a floor 11 of the passenger vehicle 16 so that the storage container 20 is arranged between the passenger seats 12, 14 and above seat bottoms 32, 34 of the passenger seats 12, 14 as shown in FIG. 1. In other embodiments, the storage container 20 may be coupled to pivot relative to the base 30 or to the passenger seats 12, 14 to provide for a middle seat in bench-style seating arrangements.

In addition to the rear storage space 26, the storage container 20 is illustratively includes an armrest mount 35, a forward recessed storage space 36, and a drawer-receiving cavity 46 as shown in FIGS. 3-5. The rear storage space 26 extends downwardly into the storage container 20 from a top surface 21 of the storage container 20 as shown in FIGS. 3-6. The armrest mount 35 extends upwardly from the top surface 21 of the storage container 20 to support the armrests 22, 24. The forward recessed storage space 36 is spaced apart from the rear storage space 26 and extends downwardly into the storage container 20 from a top surface 21 of the storage container 20 as shown in FIGS. 3-5. The drawer-receiving cavity 46 extends into a side surface 23 of the storage container 20 and is sized to receive a drawer 48 as shown in FIGS. 3-5. The side surface 23 illustratively faces the right passenger seat 14 as shown in FIGS. 1 and 2.

The rear storage space 26 is arranged adjacent to a back surface 25 of the storage container 20 near seat backs 52, 54 of the passenger seats 12, 14 as shown in FIGS. 1 and 2. In the illustrative embodiment, the rear storage space 26 is rectangular and is defined by front, back, left, and right walls 41, 42, 43, 44 along with floor 45 as shown in FIG. 5. The front, back, left, and right walls 41, 42, 43, 44 extend downwardly from the top surface 21 of the storage container 20 to the floor 45 as shown in FIG. 5. The pivot axis 22A about which the left armrest 22 moves extends along the left wall 43 and is arranged between the left and the right passenger seats 12, 14 as shown in FIG. 1. The pivot axis 24A about which the right armrest 22 moves extends along the right wall 44 and is arranged between the left and the right passenger seats 12, 14 as shown in FIG. 1.

The armrest mount 35 extends upwardly from the rear wall 42 that defines the rear storage space 26 along the back surface 25 of the storage container 20 as shown in FIGS. 3-5. The armrest mount 35 provides support for the left and the right armrest 22, 24 and includes left and right shaft-receiving bores 62, 64 that couple to the left and the right armrests 22, 24 as suggested in FIG. 6.

Each armrest 22, 24 is coupled to the armrest mount 35 for movement about a respective pivot axis 22A, 24A and includes a pad 56 and a shaft 58 extending rearwardly from the pad 56 as shown in FIG. 6. Each pad 56 has an L-shaped cross-section taken perpendicular to a corresponding axis of rotation 22A, 24A as suggested in FIGS. 5, 7A, 7B, 8A, and 8B. The cross-section includes a first leg 91 and a second leg 92 that extends perpendicular to the first leg 91 as shown in FIGS. 5, 7A, 7B, 8A, and 8B. Each pad 56 also includes a closed-position support surface 66 formed by the first leg 91 and an open-position support surface 68 formed by the second leg 92 as shown in FIGS. 5, 7A, 7B, 8A, and 8B. In the illustrative embodiment, the closed-position support surface 66 is substantially perpendicular to the open-position support surface 68. The shaft 58 of each armrest 22, 24 extends along a corresponding pivot axis 22A, 22B and is received in a corresponding left or right shaft-receiving bore 62, 64 formed in the armrest mount 35. The shafts 58 of the armrests 22, 24 and the shaft-receiving bores 62, 64 of the armrest mount 35 cooperate to couple the armrests 22, 24 to the armrest mount 35 for rotative bearing engagement.

Figure 7B:
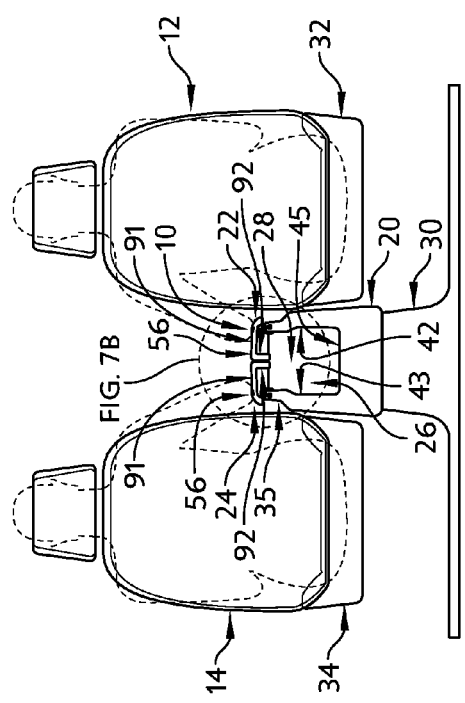
FIG. 7B is a detail view of a portion of FIG. 6A.

When the left armrest 22 is in the closed position, the pad 56 of the left armrest 22 extends over a left portion 72 of the upwardly-opening aperture 28 to block access to the rear storage space 26 through the left portion 72 as shown in FIG. 7B. Further, when the left armrest 22 is in the closed position, the closed-position support surface 66 is upwardly-facing to provide support for the arm of a passenger in the left passenger seat 12 as suggested in FIGS. 7A and 7B.

Figure 8B:
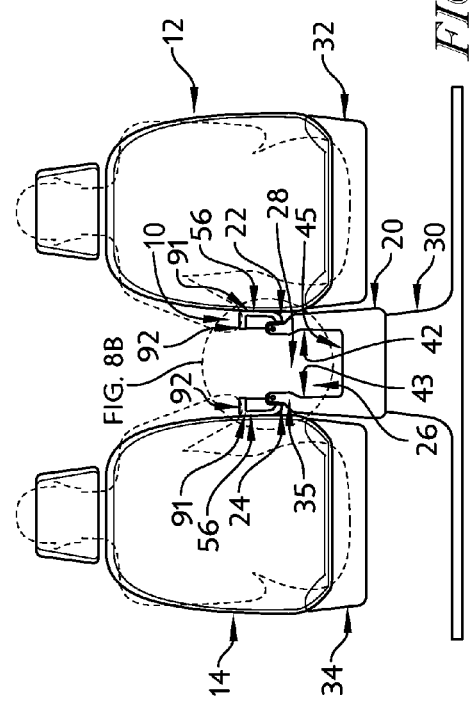
FIG. 8B is a detail view of a portion of FIG. 7A.

When the left armrest 22 is in the open position, the pad 56 of the left armrest 22 is moved away from the left portion 72 of the upwardly-opening aperture 28 to allow access to the rear storage space 26 through the left portion 72 of the aperture 28 as shown in FIG. 8B. Further, when the left armrest 22 is in the open position, the open-position support surface 68 is upwardly-facing to provide support for the arm of a passenger in the left passenger seat 12 as suggested in FIGS. 8A and 8B.

To move from the closed position to the open position, the left armrest 22 pivots about the left pivot axis 22A in a counter-clockwise direction (when viewed from the front of the passenger vehicle 16) as suggested in FIGS. 3-5. Correspondingly, the left armrest 22 pivots about the left pivot axis 22A in a clockwise direction (when viewed from the front of the passenger vehicle 16) to move from the open position to the closed position.

When the right armrest 24 is in the closed position, the pad 56 of the right armrest 24 extends over a right portion 74 of the upwardly-opening aperture 28 to block access to the rear storage space 26 through the right portion 74 as shown in FIG. 7B. Further, when the right armrest 24 is in the closed position, the closed-position support surface 66 is upwardly-facing to provide support for the arm of a passenger in the right passenger seat 14 as suggested in FIGS. 7A and 7B.

When the right armrest 24 is in the open position, the pad 56 of the right armrest 24 is moved away from the right portion 74 of the upwardly-opening aperture 28 to allow access to the rear storage space 26 through the right portion 74 of the aperture 28 as shown in FIG. 8B. Further, when the right armrest 24 is in the open position, the open-position support surface 68 is upwardly-facing to provide support for the arm of a passenger in the right passenger seat 14 as suggested in FIGS. 8A and 8B.

To move from the closed position to the open position, the right armrest 24 pivots in a clockwise direction (when viewed from the front of the passenger vehicle 16) about the right pivot axis 24A as suggested in FIGS. 3-5. Correspondingly, the right armrest 24 pivots about the right pivot axis 24A in a counter-clockwise direction (when viewed from the front of the passenger vehicle 16) to move from the open position to the closed position. In the illustrative embodiment, the left and the right portions 72, 74 of the aperture 28 cover substantially all of the aperture 28; however, in other embodiments, a central portion of the aperture 28 between the left and the right portions 72, 74 may be open at all times.

When both the left armrest 22 and the right armrest 24 are in the closed position, the upwardly-facing closed-position supporting surfaces 66 of both armrests 22, 24 are illustratively located in a first plane 82 and provide the top side of the corresponding armrest 22, 24 as shown in FIG. 7B. Further, when both the left armrest 22 and the right armrest 24 are in the closed position, the open-position support surfaces 68 are arranged in confronting relation, facing one another, as shown in FIG. 7B.

When both the left armrest 22 and the right armrest 24 are in the open position, the upwardly-facing open-position supporting surfaces 68 of both armrests 22, 24 are illustratively located in a second plane 84 and provide the top side of the corresponding armrest 22, 24 as shown in FIG. 8B. The second plane 84 is illustratively spaced above the first plane 82. Further, when both the left armrest 22 and the right armrest 24 are in the open position, the closed-position support surfaces 66 are spaced apart from one another and face away from one another as shown in FIG. 8B.

The drawer 48 in the illustrative embodiment is coupled to the storage container 20 for movement about a pivot axis 48A from a closed position, shown in FIG. 4, to an open position shown in FIG. 5. The drawer 48 defines a drawer compartment 88 sized to receive and store items in the passenger vehicle 16. When the drawer 48 is in the closed position, the drawer compartment 88 is arranged inside the storage container 20 and is inaccessible to passengers as shown in FIG. 4. When the drawer 48 is in the open position, the drawer compartment 88 is moved out of the storage container 20 and is accessible to passengers as shown in FIG. 5.

In the illustrative embodiment, another drawer-receiving cavity (not shown) and another drawer (not shown) mirroring the drawer-receiving cavity 46 and the drawer 48 are included in the center console 10 as suggested in FIGS. 1-5. The mirrored drawer-receiving cavity and drawer are substantially similar to the drawer-receiving cavity 46 and the drawer 48.

Many passenger vehicles include center consoles located between passenger seats. Such consoles often include armrests, storage spaces, and compartments. Sometimes, armrests are used to cover storage spaces included in a center console. The use of center consoles for both storage and arm support presents technical problems relating to the accessibility and size of storage spaces and compartments.

Embodiments of the present disclosure provide a solution to the technical problem that storage spaces in center consoles are sometimes inaccessible when armrests are being used to support a passengers arm. Because accessing some storage spaces can require all passengers to remove arms supported by the armrest, retrieving or storing items in the storage space during travel can be difficult. Accordingly, the present disclosure provides an armrest with a storage space that is accessible while providing arm-support surfaces for passengers seated to the left and the right of the armrest.

Additionally, embodiments of the present disclosure provide a solution to the technical problem that center console storage spaces covered by armrests may be sized only for small items. Such armrest storage spaces may allow for the storage of large items when the armrests are left open, however the ability of such armrests to support a passenger arm while open may be limited or impossible. Accordingly, the present disclosure provides a center console with a storage space and armrests that provides surfaces for supporting a passengers arm whether the storage space is closed or left open.

Although certain illustrative embodiments have been described in detail above, variations and modifications exist within the scope and spirit of this disclosure as described and as defined in the claims included in this application.

The invention claimed is:

1. A center console comprising
a storage container including a storage space and an aperture opening into the storage space, and
a cover configured to provide arm-support surfaces to passengers on left and right sides of the storage container while blocking access to the storage space through the aperture and configured to provide arm-support surfaces to passengers on left and right sides of the storage container while allowing access to the storage space through the aperture so that passengers on both left and right sides of the storage container are able to rest an arm on the cover both when access to the storage space is blocked and when access to the storage space is allowed, the cover including a left armrest and a right armrest,
wherein the left armrest has an L-shaped cross-section, the L-shaped cross-section is defined by a first leg that is formed to include a first arm-support surface and a second leg formed to include a second arm-support surface, and the left armrest is mounted to move from a first position in which the first arm-support surface is upwardly-facing to a second position in which the second arm-support surface is upwardly-facing and located above the first leg, and
wherein the right armrest has an L-shaped cross-section, the L-shaped cross-section is defined by a first leg that is formed to include a third arm-support surface and a second leg that extends perpendicular to the first leg and is formed to include a fourth arm-support surface, and the right armrest is mounted to move from a first position in which the third arm-support surface is upwardly-facing to a second position in which the fourth arm-support surface is upwardly-facing and located above the first leg.

2. The center console of claim 1, wherein the left armrest is coupled to the storage container to move relative to the storage container and the right armrest is coupled to the storage container to move relative to the storage container.

3. The center console of claim 2, wherein the left armrest is coupled to the storage container for movement about a first pivot axis and the right armrest is coupled to the storage container for movement about a second pivot axis.

4. The center console of claim 3, wherein the first pivot axis is spaced apart from the second pivot axis and is parallel to the second pivot axis.

5. The center console of claim 3, wherein the first pivot axis extends along the left side of the storage container and the second pivot axis extends along the right side of the storage container.

6. A center console comprising
a storage container formed to include a storage space and an aperture opening into the storage space, and
a container closure coupled to the storage container, the container closure including a left armrest and a right armrest,
wherein the left armrest is movable from a first position arranged to block access to the storage space through a left portion of the aperture to a second position arranged to allow access to the storage space through the left portion of the aperture, and the right armrest is movable from a first position arranged to block access to the storage space through a right portion of the aperture to a second position arranged to allow access to the storage space through the right portion of the aperture, and each of the left armrest and the right armrest has an L-shaped cross section defined by a first leg that is formed to include a first surface arranged to provide a top side of the corresponding armrest when the corresponding armrest is in the first position and second leg that is formed to include a second surface arranged to provide the top side of the corresponding armrest when the corresponding armrest is in the second position.

7. The center console of claim 6, wherein the first surface of the left armrest is substantially perpendicular to the second surface of the left armrest.

8. The center console of claim 6, wherein the second surface of the left armrest and the second surface of the right armrest are arranged in confronting relation when the left and the right armrests are both in the first position.

9. The center console of claim 6, wherein the left armrest is coupled to the storage container for movement about a first pivot axis and the right armrest is coupled to the storage container for movement about a second pivot axis.

10. The center console of claim 9, wherein the first pivot axis extends along a left side of the storage space and the second pivot axis extends along a right side of the storage space.

11. A center console comprising
a storage container,
a left armrest having a first leg that is formed to include a first arm-support surface and a second leg that extends perpendicular to the first leg and is formed to include a second arm-support surface, the left armrest coupled to the storage container for movement from a first position in which the first arm-support surface is upwardly-facing and located in a first plane to a second position in which the second arm-support surface is upwardly-facing and located in a second plane spaced above the first plane, and
a right armrest having a first leg that is formed to include a third arm-support surface and a second leg that extends perpendicular to the first leg and is formed to include a fourth arm-support surface, the right armrest coupled to the storage container for movement from a first position in which the third arm-support surface is upwardly-facing and located in the first plane to a second position in which the fourth arm-support surface is upwardly-facing.

12. The center console of claim 11, wherein the fourth arm-support surface is located in the second plane when the right armrest is in the second position.

13. The center console of claim 11, wherein the second arm-support surface is arranged in confronting relation with the fourth arm-support surface when the left armrest is in the first position and the right armrest is in the second position.

14. The center console of claim 11, wherein the left armrest is coupled to the storage container for movement about a first pivot axis and the right armrest is coupled to the storage container for movement about a second pivot axis that is spaced apart from and parallel to the first pivot axis.

15. The center console of claim 11, wherein the first arm-support surface is substantially perpendicular to the second arm-support surface and the third arm-support surface is substantially perpendicular to the fourth arm-support surface.

16. The center console of claim 11, wherein the storage container is formed to include an upwardly-opening storage space accessible through an aperture, the left armrest extends over a portion of the aperture when the left armrest is in the first position, and the right armrest extends over a portion of the aperture when the right armrest is in the first position.

17. The center console of claim 16, wherein the left armrest and the right armrest block access to the storage space through the aperture when the left armrest is in the first position and the right armrest is in the first position, and the left armrest and the right armrest allow access to the storage space through the aperture when the left armrest is in the second position and the right armrest is in the second position.

18. The center console of claim 11, wherein the second leg of the left armrest extends from the first leg of the left armrest.

* * * * *